United States Patent
Meggitt

(10) Patent No.: US 11,362,965 B2
(45) Date of Patent: Jun. 14, 2022

(54) SYSTEM AND METHOD FOR RECONFIGURABLE NETWORK DEVICE

(71) Applicant: Arista Networks, Inc., Santa Clara, CA (US)

(72) Inventor: Warren Meggitt, Los Altos, CA (US)

(73) Assignee: Arista Networks, Inc., Santa Clara, CA (US)

(*) Notice: Subject to any disclaimer, the term of this patent is extended or adjusted under 35 U.S.C. 154(b) by 18 days.

(21) Appl. No.: 16/449,296

(22) Filed: Jun. 21, 2019

(65) Prior Publication Data

US 2020/0403936 A1 Dec. 24, 2020

(51) Int. Cl.
| | |
|---|---|
| H04L 49/15 | (2022.01) |
| H04L 49/40 | (2022.01) |
| H04L 47/25 | (2022.01) |
| H04L 49/253 | (2022.01) |
| H04L 49/00 | (2022.01) |
| H04L 49/65 | (2022.01) |

(52) U.S. Cl.
CPC ............ *H04L 49/15* (2013.01); *H04L 47/25* (2013.01); *H04L 49/253* (2013.01); *H04L 49/30* (2013.01); *H04L 49/65* (2013.01)

(58) Field of Classification Search
USPC ........................................................ 370/254
See application file for complete search history.

(56) References Cited

U.S. PATENT DOCUMENTS

| | | | |
|---|---|---|---|
| 10,623,101 B1* | 4/2020 | Morris | H04B 10/40 |
| 2005/0102549 A1* | 5/2005 | Davies | G06F 11/201 |
| | | | 714/4.1 |
| 2007/0258715 A1 | 11/2007 | Androni et al. | |
| 2013/0189856 A1 | 7/2013 | Ko et al. | |
| 2016/0192044 A1* | 6/2016 | Raza | G02B 6/4292 |
| | | | 398/49 |
| 2016/0357694 A1* | 12/2016 | Lubivy | G06F 13/36 |
| 2017/0163473 A1* | 6/2017 | Sadana | H04L 47/125 |
| 2017/0308725 A1 | 10/2017 | Sardaryan et al. | |
| 2017/0353402 A1* | 12/2017 | Kenney | H04L 49/3009 |
| 2018/0097577 A1* | 4/2018 | Stone | E21B 47/135 |

(Continued)

FOREIGN PATENT DOCUMENTS

WO 2011/002397 A1 1/2011

OTHER PUBLICATIONS

International Search Report issued in corresponding Application No. PCT/US2020/020466, dated Jun. 3, 2020.

(Continued)

*Primary Examiner* — Jeffrey M Rutkowski
*Assistant Examiner* — Luna Weissberger
(74) *Attorney, Agent, or Firm* — Chamberlain, Hrdlicka, White, Williams & Aughtry

(57) ABSTRACT

A network device includes a hardware component. The network device includes a first device receiver operably connected to the hardware component via a first hardware component connection and adapted to receive a device. The network device further includes a second device receiver operably connected to the hardware component via a second hardware component connection. The first device receiver of the network device is adapted to reversibly reallocate the first hardware component connection to the second device receiver.

16 Claims, 12 Drawing Sheets

(56) References Cited

U.S. PATENT DOCUMENTS

2018/0131635 A1* 5/2018 Sardaryan .............. H04L 67/10
2020/0177525 A1* 6/2020 Morris ................... H04L 12/50

OTHER PUBLICATIONS

Written Opinion issued in corresponding Application No. PCT/US2020/020466, dated Jun. 3, 2020.
"Accelerating 400GbE Adoption with QSFP-DD"; QSFP-DD MSA; Mar. 10, 2017.
Mark Nowell et al.; "QSFP-DD: Enabling 15 Watt Cooling Solutions"; White Paper, QSFP-DD MSA; Mar. 12, 2018.

* cited by examiner

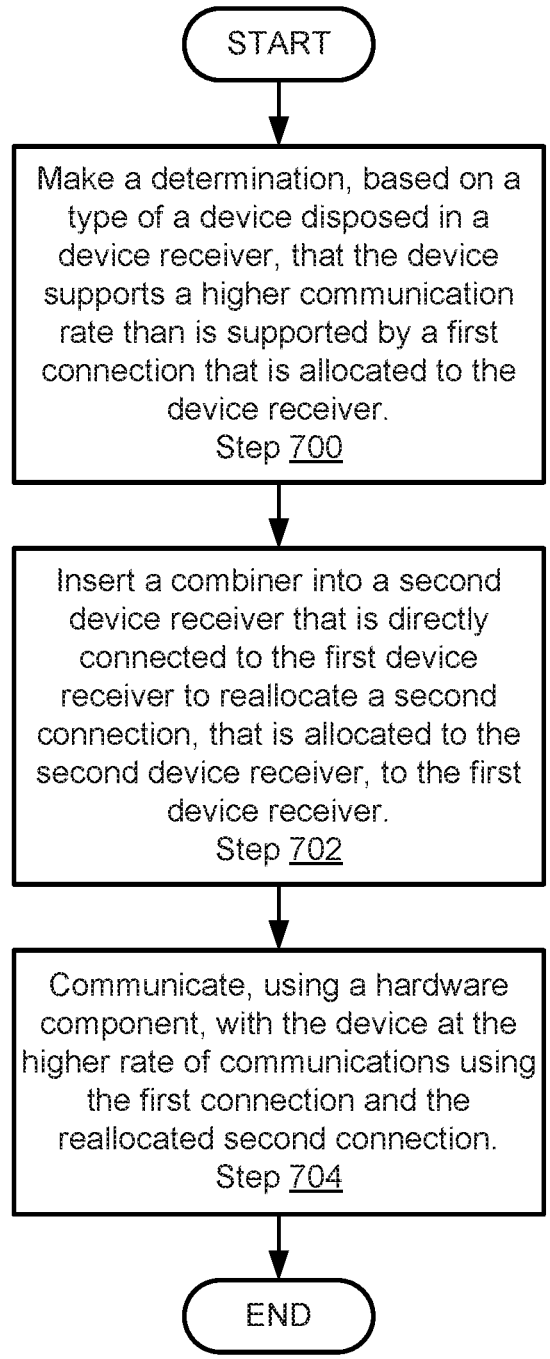
FIG. 7.1

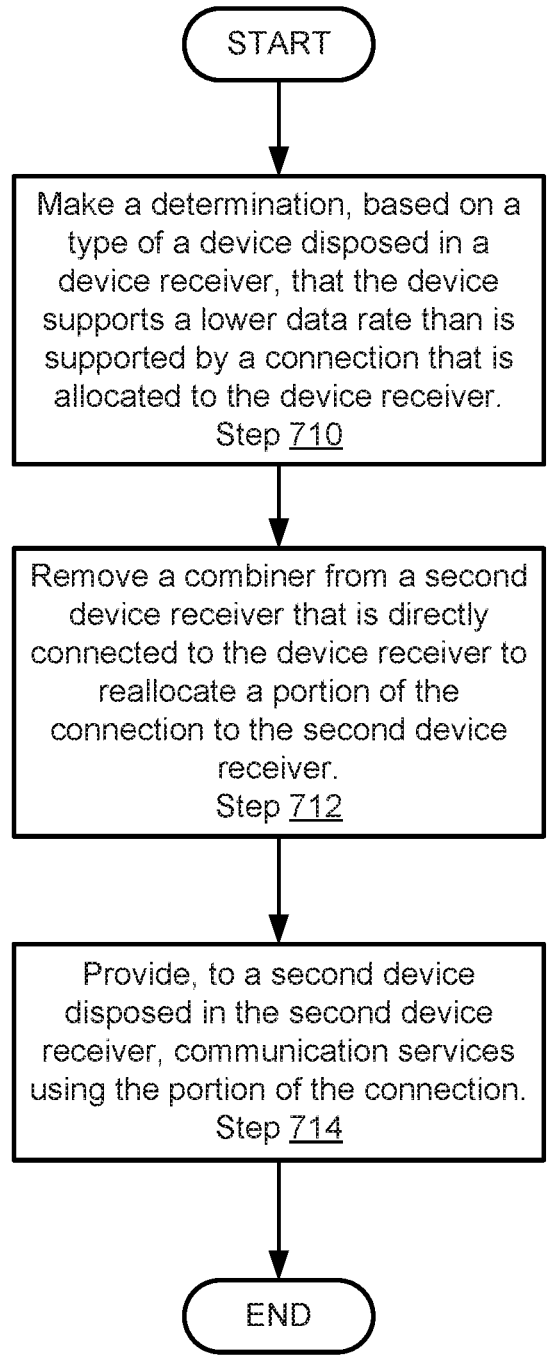
FIG. 7.2

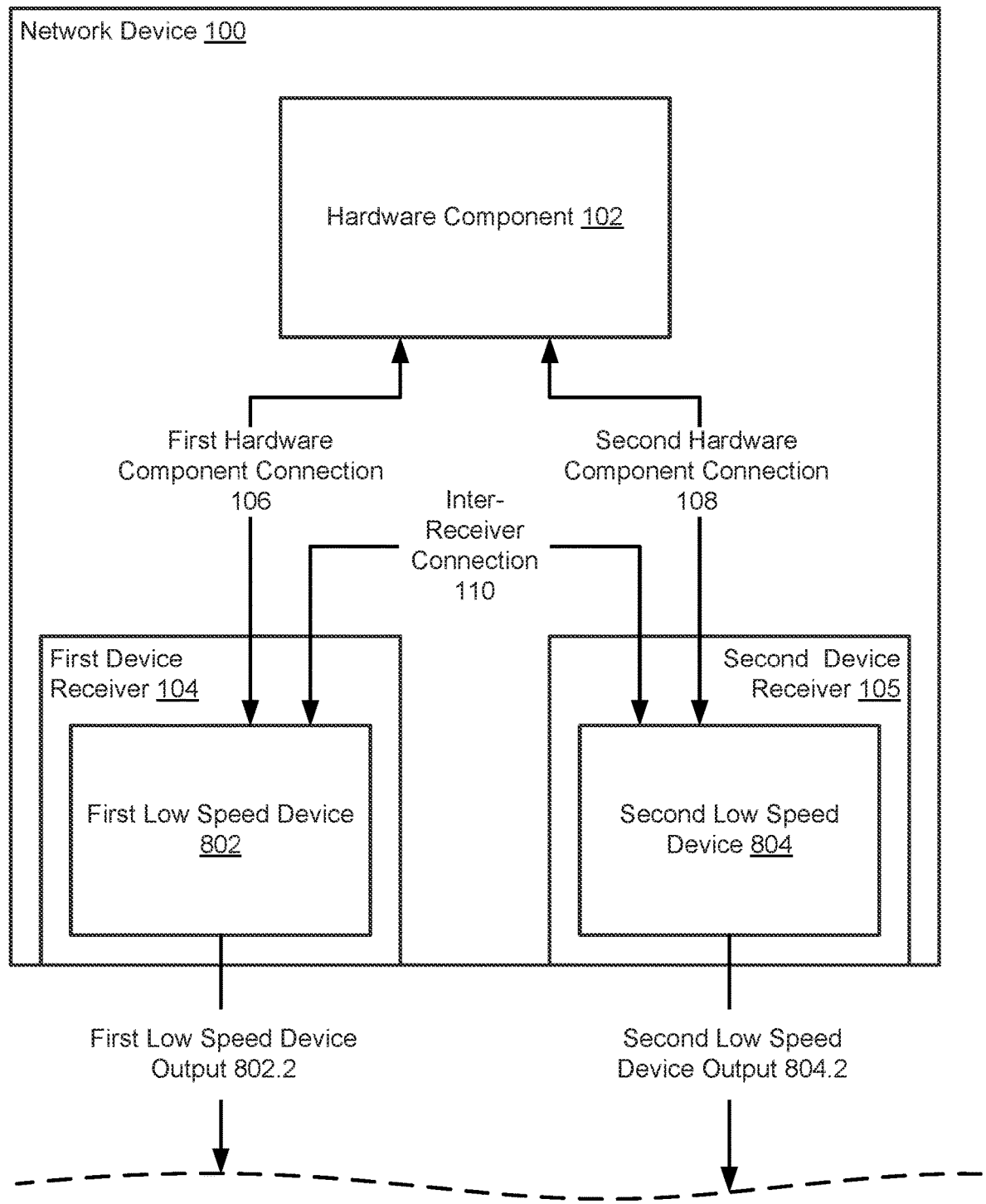
FIG. 8.1

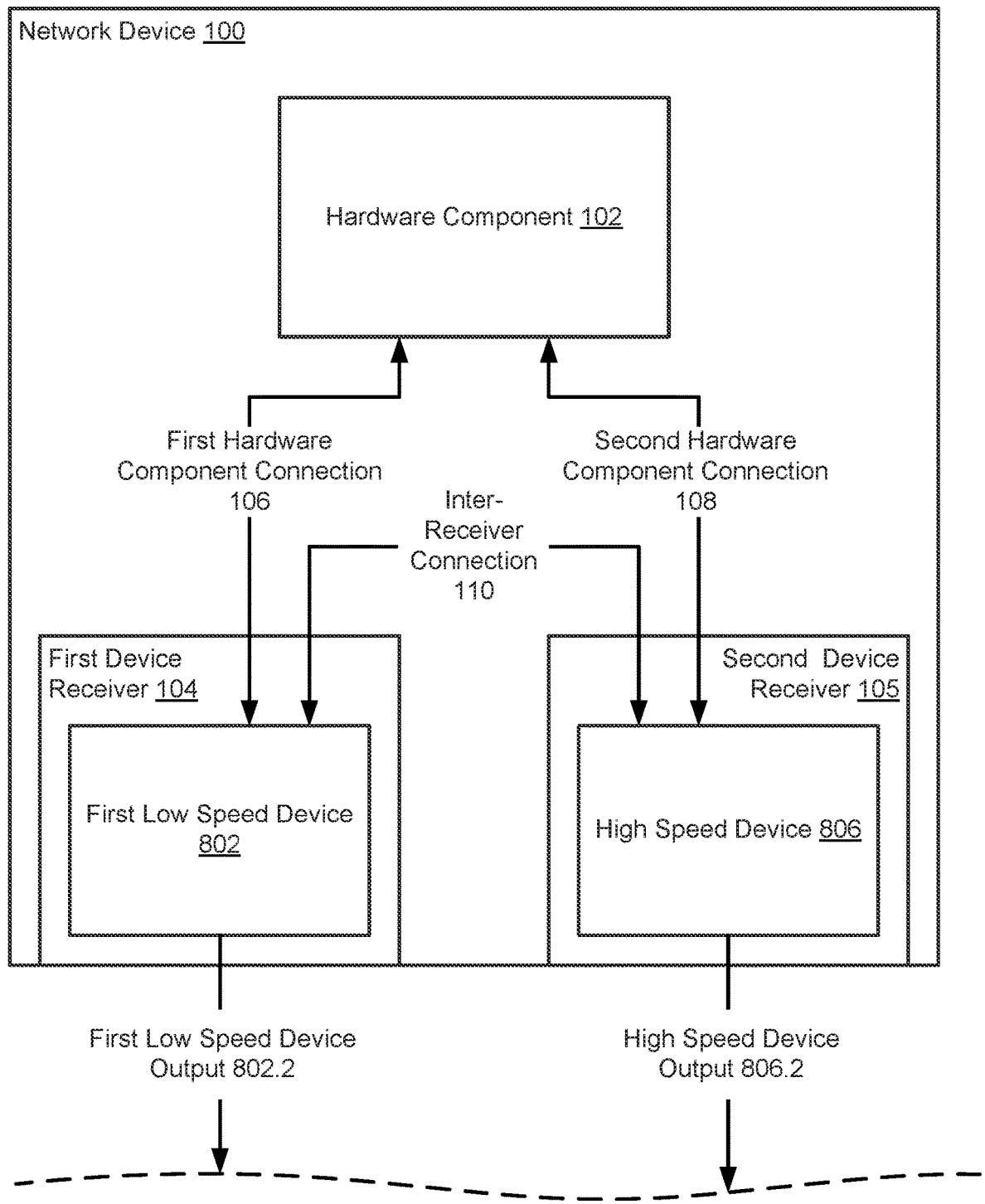
FIG. 8.2

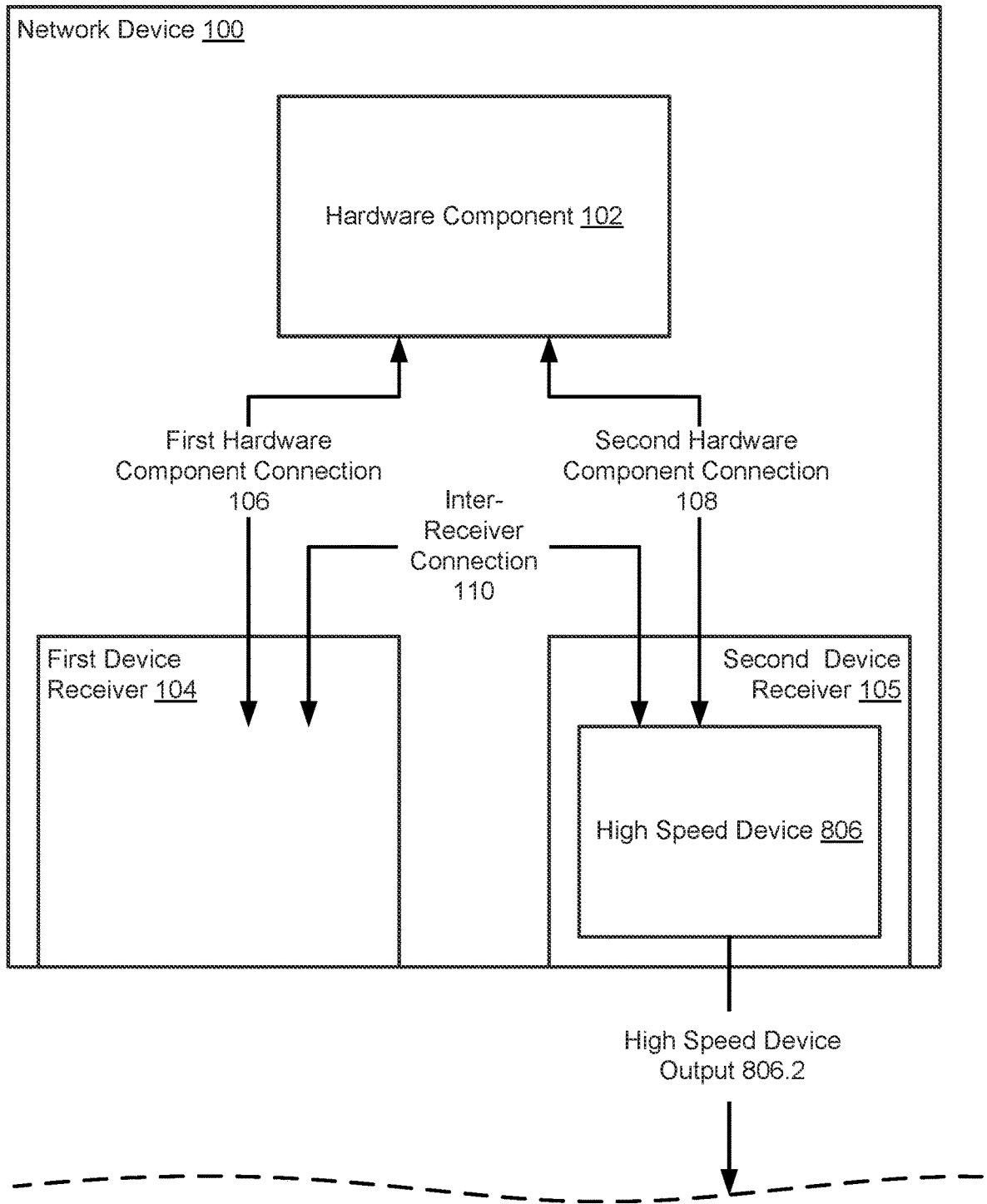
FIG. 8.3

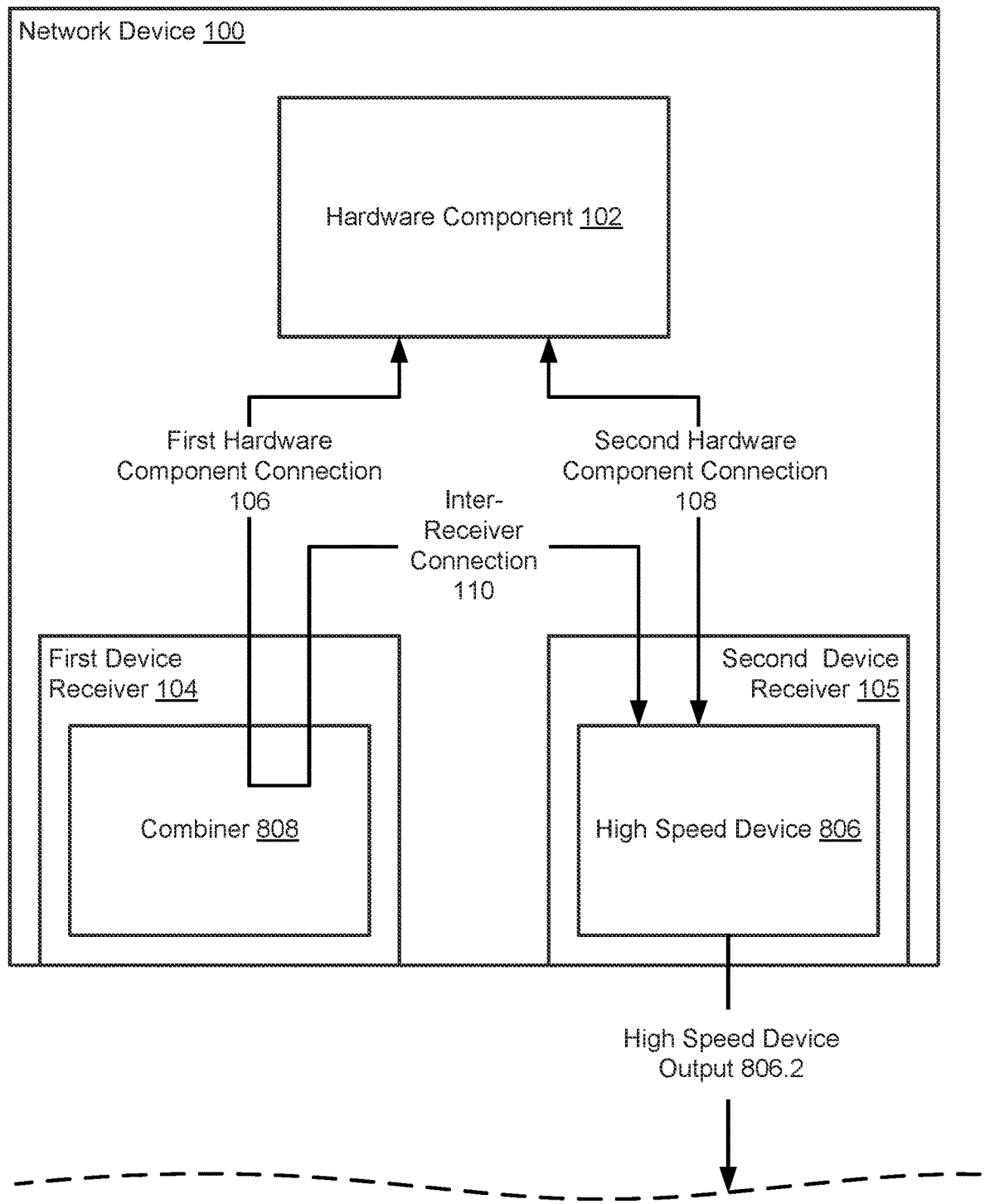
FIG. 8.4

SYSTEM AND METHOD FOR RECONFIGURABLE NETWORK DEVICE

BACKGROUND

Network devices may provide traffic management services to manage network traffic. The traffic management services may include receiving network data units and forwarding the network data units to destination devices. To provide traffic management services, the network devices may be operatively connected to any number of other devices that also provide traffic management services.

SUMMARY

In one aspect, a network device in accordance with one or more embodiments disclosed herein includes a hardware component; a first device receiver operably connected to the hardware component via a first hardware component connection and adapted to receive a device; and a second device receiver operably connected to the hardware component via a second hardware component connection. The first device receiver is adapted to reversibly reallocate the first hardware component connection to the second device receiver.

In one aspect, a method in accordance with one or more embodiments disclosed herein includes making a determination, based on a type of a device disposed in a first device receiver, that the device supports a higher rate of communications than is supported by a first connection that is allocated to the first device receiver; in response to the determination: inserting a combiner into a second device receiver, that is directly connected to the first device receiver, to reallocate a second connection, that is allocated to the second device receiver, to the first device receiver; and communicating, using a hardware component, with the device at the higher rate of communications using: the first connection, and the reallocated second connection.

BRIEF DESCRIPTION OF DRAWINGS

Certain embodiments will be described with reference to the accompanying drawings. However, the accompanying drawings illustrate only certain aspects or implementations of the embodiments by way of example and are not meant to limit the scope of the claims.

FIGS. 7.1-7.2 show flowcharts of methods that may be used to reallocate communications bandwidth in accordance with one or more embodiments disclosed herein.

FIGS. 8.1-8.4 show diagrams of an example network device as its communication bandwidth is reallocated.

DETAILED DESCRIPTION

Figure 1:
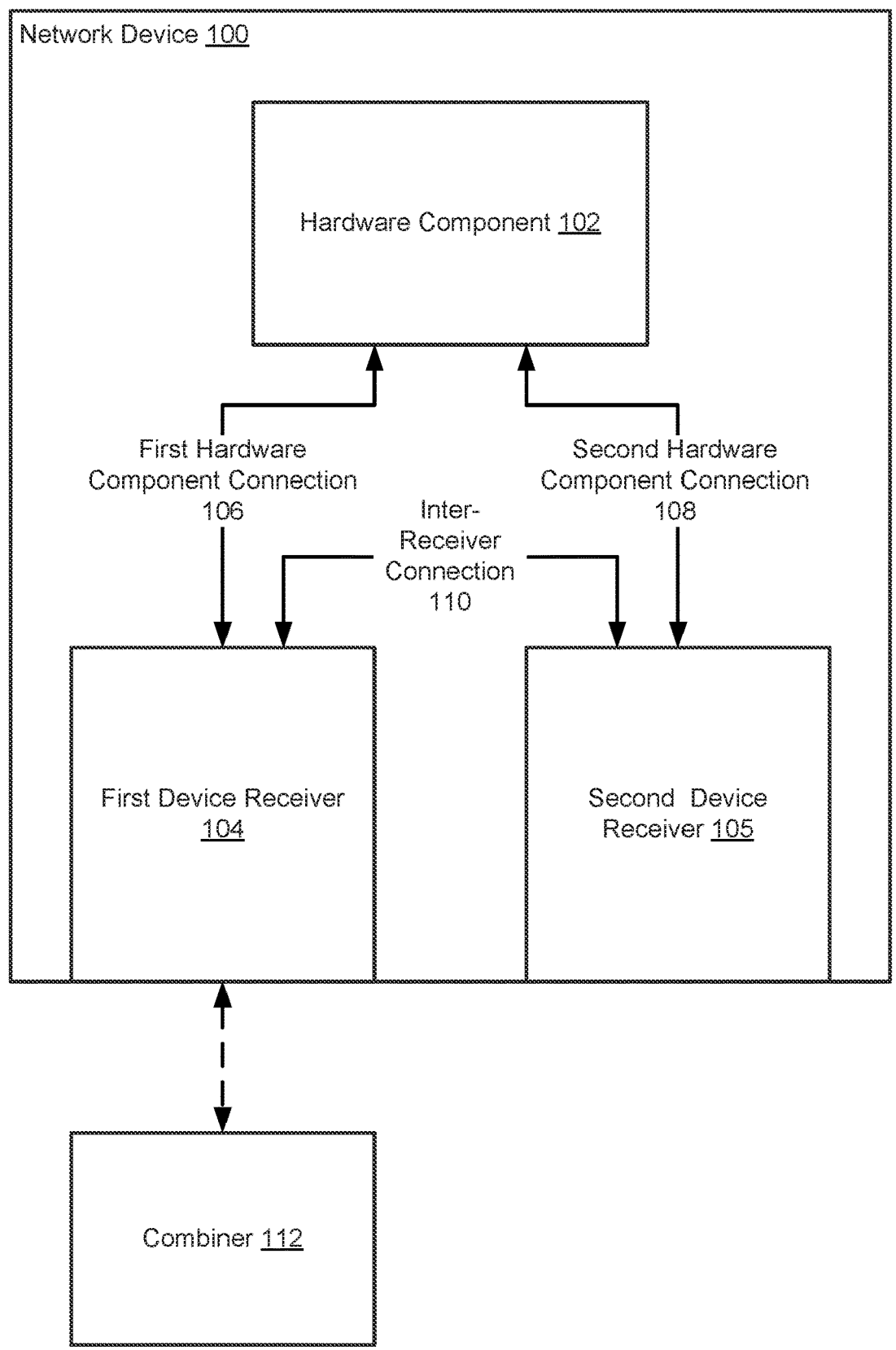
FIG. 1 shows a first diagram of an example network device in accordance with one or more embodiments disclosed herein.

Specific embodiments will now be described with reference to the accompanying figures. In the following description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for reallocating communication bandwidth between components of a network device. A network device may include a limited amount of communication bandwidth supported by a number of operable connections. As the communication bandwidth needs of components of the network device change, the network device may reallocate its communication bandwidth by modifying an arrangement of its operable connections.

In one or more embodiments, the arrangement of a network device's operable connections are modified by a combiner. A combiner may be a physical device that modifies the physical connections between components of a network device. Modifying the physical connections of a network device may modify the arrangement of the network device's operable connections.

FIG. 1 shows a network device (100) in accordance with one or more embodiments described herein. As shown in FIG. 1, the network device (100) may include a hardware component (102), a first device receiver (104), and a second device receiver (105). The hardware component (102) may communicate with remote devices (e.g., devices operably connected to the network device (100)) using devices disposed in the first device receiver (104) and/or the second device receiver (105) (and/or any number of other device receivers not illustrated in FIG. 1).

The network device (100) may reallocate communication bandwidth (e.g., communication rates) between the hardware component (102) and the device receivers (e.g., 104, 105) to match the needs of the devices disposed in the device receivers. By doing so, the limited communication bandwidth available to the network device may be efficiently marshaled to meet the capabilities (e.g., supported communication bandwidths) of the respective devices.

To reallocate communication bandwidth, a combiner may be received by one of the device receivers. While received by one of the device receivers, the communication bandwidth allocated to the device receiver that is receiving the combiner may be reallocated to different device receiver. The reallocation may be performed by reversibly modifying the physical connectivity between the device receivers and the hardware component via the combiner.

Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (100) include, but are not limited to, a network switch, a router, a multilayer switch, a fiber channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (100).

In one or more embodiments, a network device (100) also includes and/or is operatively connected to device storage and/or device memory (i.e., non-transitory computer readable mediums) storing software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100)) that facilitate network connectivity for one or more operatively connected devices (e.g., computing devices, data storage devices, other network devices, etc.). In one or more embodiments, the network device (100) and other devices within the network (not shown) are arranged in a network topology (not shown). In one or more embodiments, a network topology is an arrangement of various elements of a network. As will be discussed in greater detail below, the network device (100) may utilize devices disposed in the device receivers (e.g., 104, 105) to facilitate network connectivity.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, a hardware component (102) is any hardware (e.g., circuitry such as, for example, application specific integrated circuits (ASICs)), which may include and/or be programmed by/with software and/or firmware, that includes functionality related to receiving, processing, and/or transmitting network traffic data units in accordance with one or more embodiments described herein. In one or more embodiments, a hardware component (102) is a packet processor (e.g., a network chip), a field programmable gate array (FPGA), and/or any other component into which may be used to facilitate network connectivity.

In one or more embodiments, the network device (100) includes any number of hardware components (102) (e.g., network chips, field programmable gate arrays (FPGAs), etc.). While illustrated in FIG. 1 as including a single hardware component (102), a network device in accordance with embodiments may include multiple hardware components. In such a scenario, each of the hardware components may be operably connected to all, or respective portions, of the device receivers (e.g., 104, 105) of the network device (100).

In order to perform such functionality, a hardware component may include any number of sub-components (not shown). Such subcomponents may include, but are not limited to, one or more processors, one or more buffers, any type or amount of storage of any type for storing hardware tables (e.g., forwarding information tables). Such tables may control, at least in part, various aspects of the operation of a network device (100), such as functionality related to network traffic data unit forwarding, maximum transmission unit enforcement, encapsulation/decapsulation, address rewrites, etc. Examples of storage for hardware tables may include, but are not limited to, tertiary content addressable memory (TCAM) and static random access memory (SRAM). A hardware component may also include and/or be operatively connected to any number of physical network interfaces of a network device (100). Such interfaces may provide a path external to the network device (e.g., to other devices), and/or may be operatively connected to other components internal to the network device (100), and each such interface may be an ingress and/or egress interface.

As a non-limiting example, a hardware component may be and/or may include an ASIC that receives network traffic data units at an ingress port and, so long as no security policy—or MTU enforcement policy associated with a forwarding information that a given network traffic data unit is in—indicates that the network traffic data units should be dropped, determines out of which egress port on the network device (100) to forward the network traffic data units.

In one or more embodiments, a network device (100) includes and/or is operatively connected to a first device receiver (104) and a second device receiver (105). For example, the hardware component (102) may be operatively connected to the device receivers (e.g., 104, 105) via respective hardware component connections (e.g., 106, 108). The hardware component connections (e.g., 106, 108) may be operable connections that support up to a predetermined rate of transferring data between devices (not shown) disposed in the device receivers (e.g., 104, 105) and the hardware component (102) (and/or other components of the network device (100) not illustrated in FIG. 1).

The hardware component (102) may include functionality to communicate with devices disposed in the device receivers (e.g., 104, 105) via the hardware component connections (e.g., 106, 108). For example, the hardware component (102) may transmit and receive electrical signals using the hardware component connections (e.g., 106, 108) to communicate with the devices disposed in the device receivers.

The hardware component (102) may be adapted to communicate with devices disposed in the device receivers (e.g., 104, 105) depending on an allocation of the hardware component connections (e.g., 106, 108). As will be discussed in greater detail below, the hardware component connections may be reallocated between different device receivers. To communicate with the devices disposed in the device receivers, the hardware component (102) may (i) identify an allocation of the hardware component connections and (ii) direct communications using the hardware component connections based on the allocation. By doing so, the hardware component (102) may identify which hardware component connections are allocated to corresponding devices and communicate with the aforementioned devices using the allocated hardware component connections.

Devices that may be disposed in the device receivers (e.g., 104, 105) may be, for example, optical transceivers (or other types of devices for facilitating communications) that are adapted to convert electrical signals received via the hardware component connection and/or other connections (e.g., the inter-receiver connection (110)) to optical signals. The optical signals may be used by the devices to communicate with other devices to, for example, facilitate network communications between the hardware component (102) and any number of other devices operably connected to the hardware component (102) via the devices. The devices that may be disposed in the device receivers (e.g., 104, 105) may be other types of devices without departing from embodiments disclosed herein.

In one or more embodiments of the invention, the device receivers (e.g., 104, 105) are adapted to receive at least two types of devices having different form factors. For example, a device receiver may be adapted to receive both quad small form factor pluggable devices and quad small form factor pluggable double data rate devices. The quad small form factor pluggable devices may utilize a portion of the contacts, discussed in greater detail below, of the device receiver for communications purposes. In contrast, quad small form factor pluggable double data rate devices may utilize all of the contacts of the device receiver for communications purposes. The device receivers (e.g., 104, 105) may be adapted to receive additional, fewer, and/or types of devices having different form factors without departing from than the invention.

In one or more embodiments, the first device receiver (104) is operably connected to the second device receiver (105) via an inter-receiver connection (110). The inter-receiver connection (110) may be an operable connection that supports communication between portions of the first device receiver (104) and the second device receiver (105) up to a predetermined rate of transferring data between devices (not shown) disposed in the device receivers (e.g., 104, 105) and/or the hardware component (102). The predetermined rate of transferring data supported by the inter-receiver connection (110) may be similar to the predetermined rate of transferring data for communication purposes supported by the hardware component connections (e.g., 106, 108).

In one or more embodiments, the device receivers (e.g., 104, 105) are physical devices for receiving other devices. A device may be received by a device receiver by operably connecting the device to a device receiver. For example, a device may be received by a device receiver by inserting all, or a portion, of the device into a device receiver to dispose the device totally, or partially, in the device receiver (e.g., 104, 105). When the device is disposed in the device receiver, electrical connections between the device and the device receiver may be formed that provide one or more operable connections between the device and the device receiver. As will be discussed in greater detail below, the operable connections between the device receiver and other devices (e.g., the hardware component (102), other device receivers, etc.) may operably connect the device to the other devices while received by the device receiver.

In one or more embodiments, the device receivers (e.g., 104, 105) are adapted to operably connect devices received by the device receivers (e.g., 104, 105) to respective hardware component connections and/or the inter-receiver connection (110) depending on a type of the received devices.

For example, the first device receiver (104) may be adapted to operably connect a first device type (e.g., an optical transceiver) to the first hardware component connection (106) when the first device type is received by and/or disposed in the first device receiver (104). The first device receiver (104) may be further adapted to operably connect a second device type (e.g., a high-speed optical transceiver) to the first hardware component connection (106) and the inter-receiver connection (110) when the second device type is received by and/or disposed in the first device receiver (104). By doing so, different types of devices, while disposed in the device receivers, may be operably connected to different groups of other devices (e.g., other receivers, the hardware component (102)). For additional details regarding device receivers, refer to FIGS. 2-3. For additional details regarding the operable connections supported by the device receivers (e.g., 104, 105), refer to FIGS. 4-6.

By forming operable connections as discussed above, the device receivers (e.g., 104, 105) may facilitate the reallocation of hardware component connections (e.g., 106, 108) between device receivers (e.g., 104, 105) that are operably connected by an inter-receiver connection (e.g., 110). For example, consider a scenario in which a high-speed device that could support communications having a data transfer rate that is the aggregate data transfer rate of both of the first hardware component connection (106) and the second hardware component connection (108). In such a scenario, the high-speed device may be operably connected to both of the second hardware component connection (108) and the inter-receiver connection (110). However, as illustrated in FIG. 1, the high-speed device may not be operably connected to the first hardware component connection (106) and, consequently, may only be able to utilize the second hardware component connection (108) for communications purposes with respect to the hardware component (102). In this scenario, the high-speed device may be limited to only utilizing a portion of a first data transfer rate that it supports for communications because the second hardware component connection (108), which is its only connection to the hardware component (102) as illustrated in FIG. 1, may only support a second data transfer rate for communications that is substantially less than first data transfer rate supported by the hardware component (102).

One or more embodiments may provide a method for reallocating hardware component connections (e.g., 106, 108) between device receivers (e.g., 104, 105). By doing so, the data transfer rate between a device disposed in a device receiver and the hardware component (102) may be modified. The modification may be made, for example, to match a first data transfer rate supported by the device and a second data transfer rate (e.g., data transfer rate supported by aggregated hardware component connections or a single hardware component connection) between a hardware component (102) and the device.

To reallocate a hardware component connection, a combiner (112) in accordance with one or more embodiments may be used. A combiner (112) may be a physical device for reallocating hardware component connections between device receivers (e.g., 104, 105). To do so, the combiner (112) may be adapted to, when received by a device receiver (e.g., 104, 105), operably connect a hardware component connection (e.g., 106) and an inter-receiver connection (e.g., 110). By doing so, a hardware component connection (e.g., 106) that is operably connected to a device receiver (e.g., 104) may be operably connected to a second device receiver (e.g., 105) via an inter-receiver connection (e.g., 110). In such a scenario, a device disposed in the second device receiver (e.g., 105) may be operably connected to a hardware component (e.g., 102) through multiple hardware component connections (e.g., 106, 108). Consequently, the data transfer rate between the device and the hardware component may be the aggregate of the data transfer rates supported by both of the hardware connections (e.g., 104, 105).

In one or more embodiments of the invention, the combiner (112) is a quad small form factor pluggable double data rate device (or another type of device that may be received by a device receiver). The combiner (112) may be adapted to operably connect, while disposed in a device receiver, a first portion of the contacts of a device receiver to a second portion of the contacts of the device receiver. By doing so, the combiner (112) may operably connected a hardware component connection to an inter-receiver connection to reallocate the hardware component connection to another device receiver. Thus, the combiner (112) may facilitate reconfiguration of the network device (100) by reallocating operable connections. For additional details regarding the combiner (112), refer to FIGS. 5-6.

In one or more embodiments, the first hardware component connection (106) is implemented using a wired connection. The wired connection may include a number of signal, transmit, ground, timing, clock, and/or other types of lines corresponding to a communication scheme implemented between the hardware component (102) and the first device receiver (104). The second hardware component connection (108) may be similar to the first hardware component connection (106). The wired connection may include signal regenerators or other types of devices for facilitating communications between devices operably connected by the hardware component connection.

In one or more embodiments, the inter-receiver connection (110) is implemented using a wired connection. The wired connection may be similar to the wired connections used to implement the first hardware component connection (106) and/or the second hardware component connection (108).

The wired connections, discussed with respect to the first hardware component connection (106), the second hardware component connection (108), and the inter-receiver connection (110), may be implemented using wire lines (e.g., conductors operably connecting portions of the component interconnected by the aforementioned connections), sheathing (e.g., dielectric materials for electrical insulation), and/or adapters (e.g., devices for facilitating physical connections between the wire lines and/or the components interconnected by the aforementioned connections).

In one or more embodiments, the first hardware component connection (106), the second hardware component connection (108), and the inter-receiver connection (100) supports 200 Gigabits/second (200G) communications via 2×100GBASE-SR4 Ethernet, 1×200GBASE-SR4 Ethernet, or another form of communications (e.g., a different protocol) supporting 200G communications. The aforementioned connections may support other communications rates (e.g., 40G, 100G, etc.) and may be implemented using other types of communication protocols without departing from the invention.

While the network device (100) has been described and illustrated with respect to an example that includes a limited number of specific components, a network device (100) in accordance with one or more embodiments may include additional, fewer, and/or different components without departing from embodiments disclosed herein. For example, while the network device (100) has been illustrated as including two device receivers (e.g., 104, 105) and a hardware component (102), a network device in accordance with one or more embodiments may include any number of device receivers and any number of hardware components. In such a scenario, any number of device receivers may be interconnected using any number of inter-receiver connections without departing from embodiments disclosed herein. Additionally, the network device (100) may include any number of combiners that may be used to reconfigure the connectivity of the network device (100).

Figure 2:
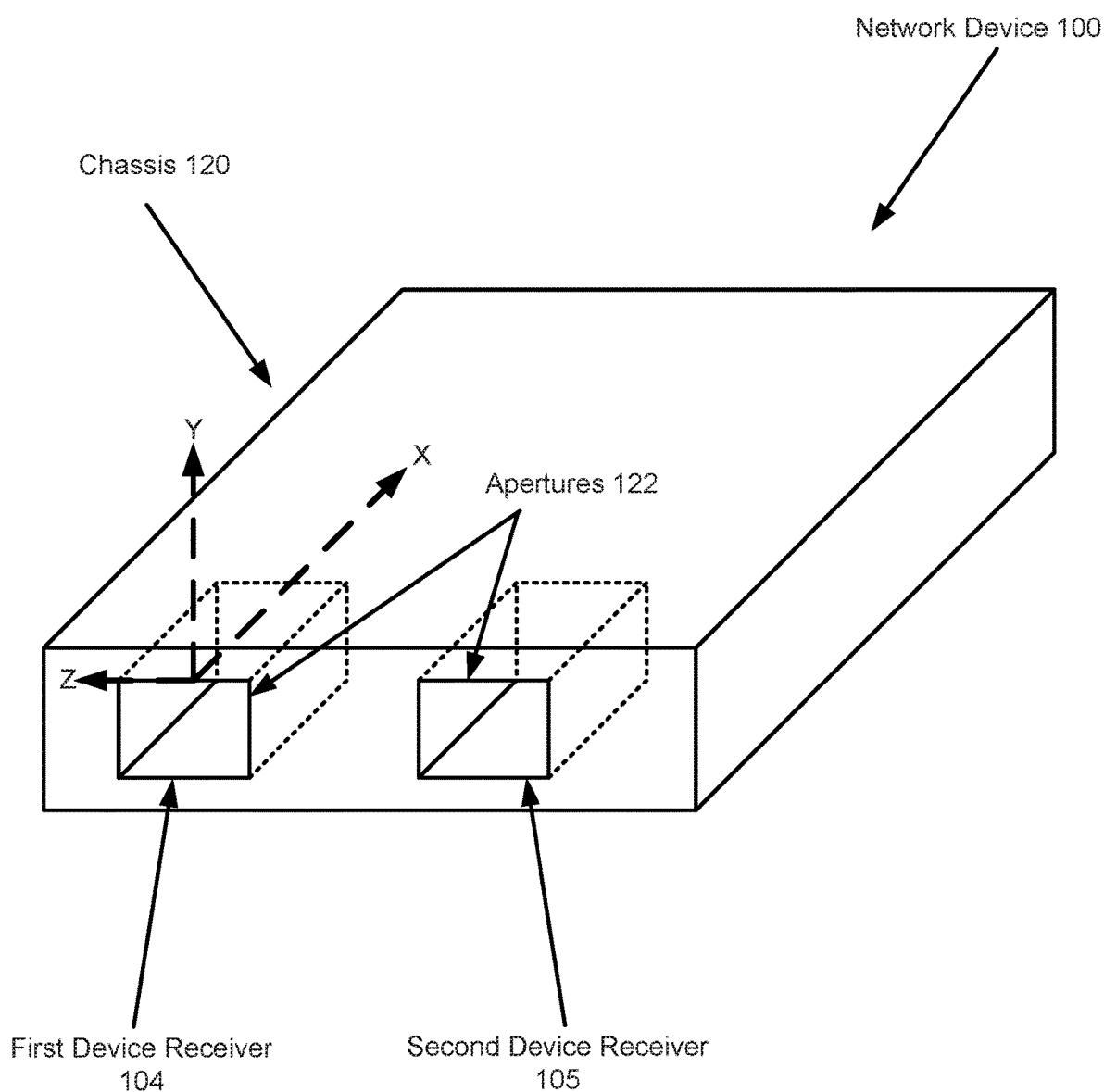
FIG. 2 shows a second diagram of the example network device in accordance with one or more embodiments disclosed herein.

To further clarify aspects of one or more embodiments, an isometric diagram of the network device in accordance with one or more embodiments is shown in FIG. 2. The network device (100) may include a chassis (120). The chassis (120) may be a physical device for housing the components of the network device (100) illustrated in FIG. 1.

For example, the chassis (120) may be a mountable chassis adapted to be reversibly attached to a rack. The rack may be a physical device for positioning and/or orienting the network device (100) and/or other types of devices. A rack may be used, for example, in a high density environment to position and/or orient devices in a manner that facilitates spatially packing the devices densely.

The chassis may include apertures (122) corresponding to one or more of the device receivers. The apertures (122) may be voids in a boundary of the chassis (120) that facilitate insertion and/or removal of devices from the device receivers (e.g., 104, 105).

The device receivers (e.g., 104, 105) may include voids for receiving devices. In FIG. 2, the boundaries of the voids that are obscured by the chassis are illustrated using short-dashed lines. While illustrated in FIG. 2 as being rectangular, the voids may be of other shapes without departing from embodiments disclosed herein. The shapes of the voids may correspond to types of devices which the device receivers are adapted to receive.

To further clarify aspects of embodiments, a XYZ axes label is included in FIG. 2. The XYZ axes label is included only for explanatory purposes to clarify the location of planes described with respect to FIGS. 3-5 and should not be interpreted as limiting the structure of a network device in accordance with one or more embodiments.

Figure 3:
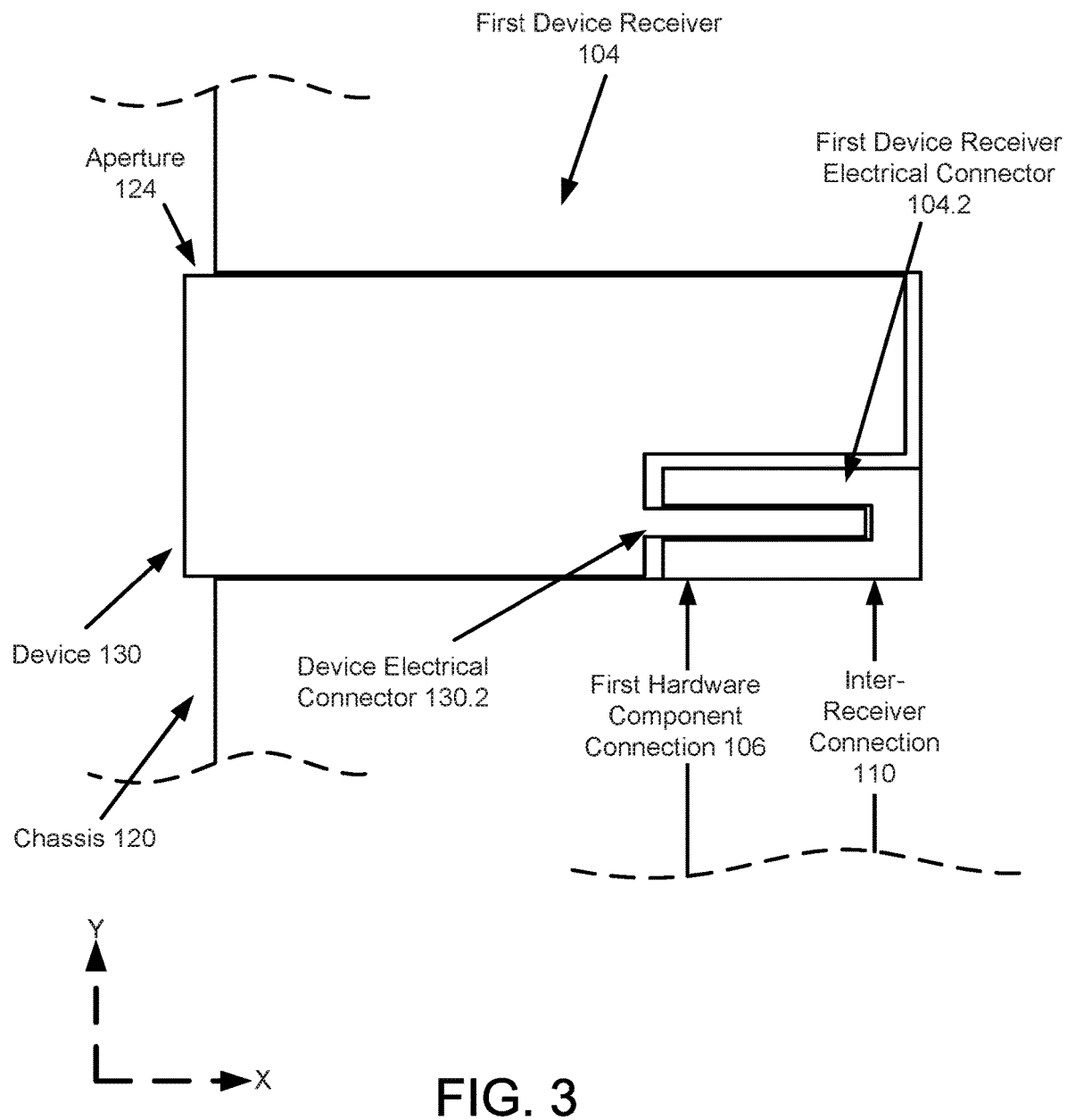
FIG. 3 shows a diagram of a device receiver of the example network device in accordance with one or more embodiments disclosed herein.

As discussed above, devices may be disposed in device receivers. FIG. 3 shows a cut view diagram of the network device (100) in accordance with one or more embodiments. The cut view diagram is taken along the XY plane of FIG. 2 and illustrates a portion of the network device (100) near the first device receiver (104) when a device (130) is disposed in the first device receiver (104).

As discussed above, when a device (130) is received by and/or is disposed in the first device receiver (104), the device may be operably connected to the first hardware component connection (106) and/or the inter-receiver connection (110), depending on the type of the device. The device (130) may be received by inserting the device (130) through the aperture (124) in the chassis. To facilitate formation of such connections, the first device receiver (104) may include a first device receiver electrical connector (104.2).

The first device receiver electrical connector (104.2) may be a physical device that facilitates reversibly forming operable connections between the first hardware component connection (106) and/or the inter-receiver connection (110) and the device (130) (and/or other types of devices that may be received by/disposed in the first device receiver (104) at different points in time). For example, the first device receiver electrical connector (104.2) may include any number of electrical contacts adapted to form operable connections with corresponding electrical contacts disposed on a device electrical connector (130.2) of the device. Depending on the number and/or placement of the electrical contacts on the device electrical connector (130.2), the device (130) may be operably connected with (i) only the first hardware component connection (106) or (ii) the first hardware component connection (106) and the inter-receiver connection (110). For additional details regarding electrical contacts of the first device receiver electrical connector (104.2), refer to FIGS. 4-5, respectively.

The first device receiver electrical connector (104.2) may operably connect the electrical contacts disposed on the first device receiver electrical connector (104.2) to the first hardware component connection (106) and/or the inter-receiver connection (110) via any method. For example, the electrical contacts may be operably connected to the first hardware component connection (106) and/or the inter-receiver connection (110) via wire lines or other types of physical connections.

Figure 4:
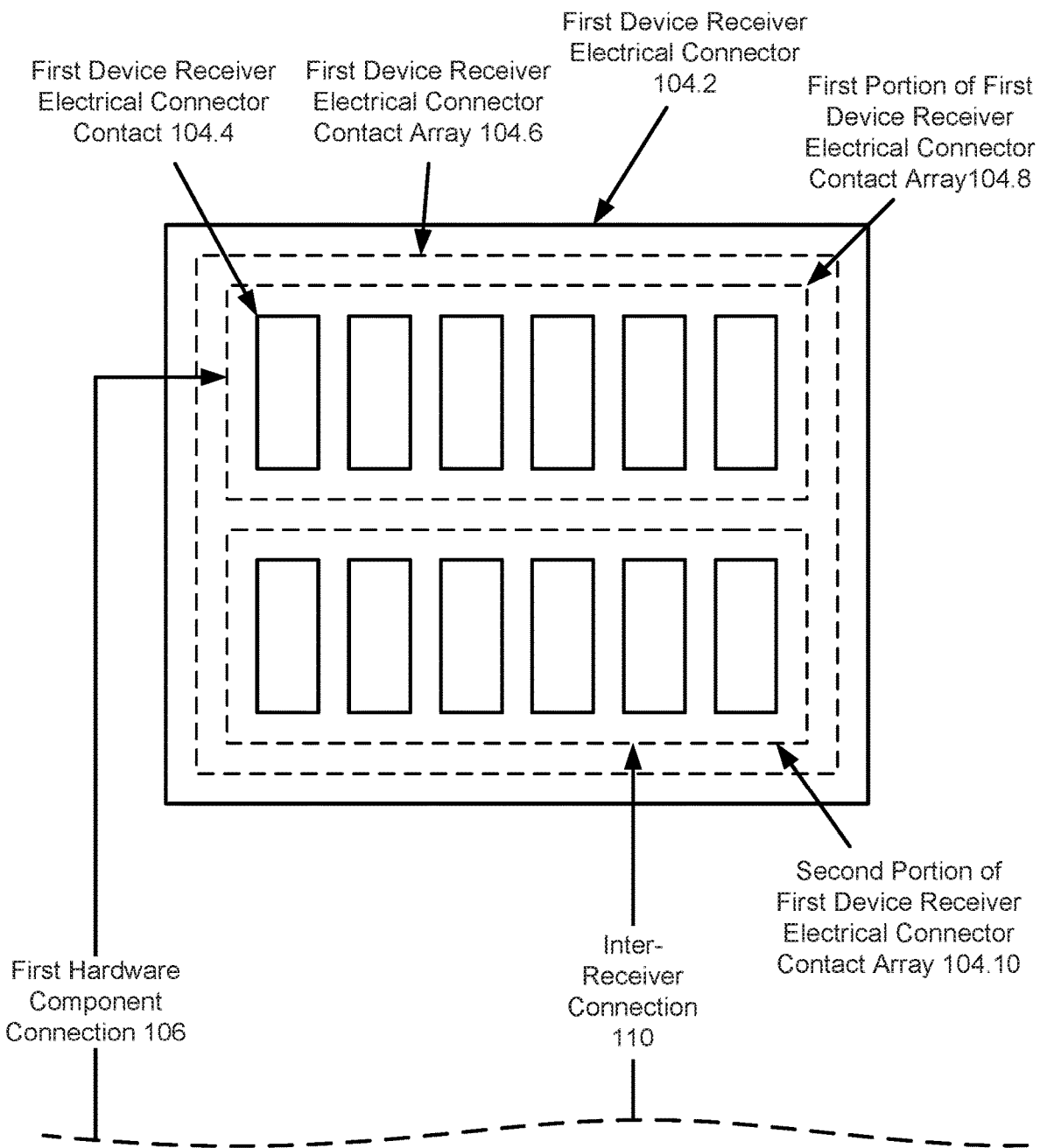
FIG. 4 shows a diagram of a device receiver electrical connector of the example network device in accordance with one or more embodiments disclosed herein.
Figure 5:
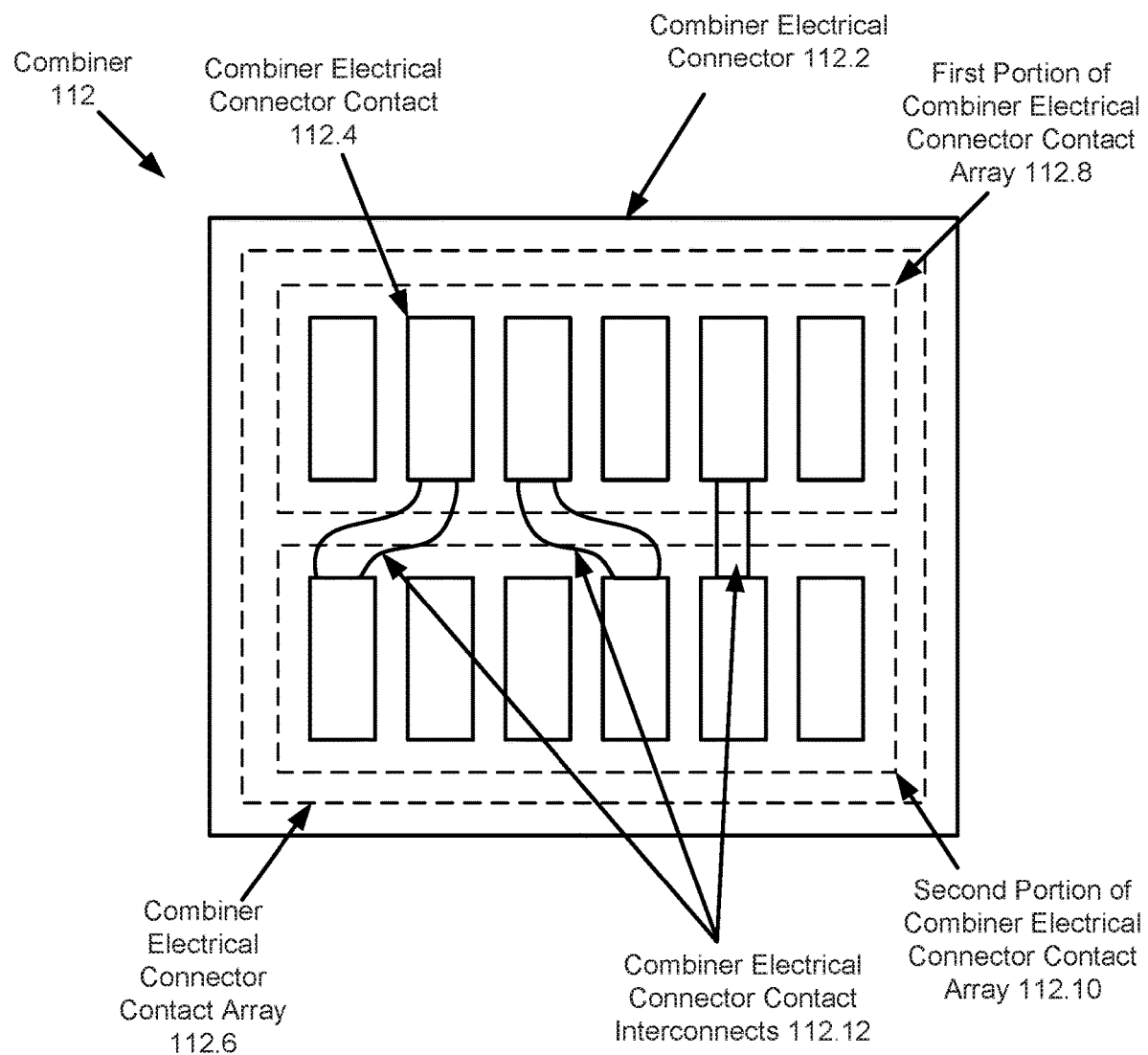
FIG. 5 shows a diagram of an electrical connector of a combiner in accordance with one or more embodiments disclosed herein.

To further clarify aspects of embodiments, diagrams of electrical contacts of a first device receiver electrical connector and a combiner electrical connector are shown in FIGS. 4-5, respectively. As noted above, the electrical contacts may be used to operatively connect components of the network device (100).

FIG. 4 shows a top view diagram of a portion of the first device receiver electrical connector (104.2) in accordance with one or more embodiments. The first device receiver electrical connector (104.2) may include a first device receiver electrical connector contact array (104.6). The first device receiver electrical connector contact array (104.6) may be an arrangement of first device receiver electrical connector contacts (e.g., 104.4). A first device receiver electrical connector contacts (e.g., 104.4) may be a physical device for forming an electrical connection with a corresponding contract on another device.

For example, the first device receiver electrical connector contact (104.4) may be a pad disposed on circuit card or another suitable media. The pad may be a metal structure that, while in contact with another structure, forms an electrical connection between the first device receiver electrical connector contact (104.4) and the another structure.

In one or more embodiments, the first device receiver electrical connector contact array (104.6) are arranged to match the contacts of a quad small form factor pluggable double data rate device. For example, the first device receiver electrical connector contact array (104.6) may have shapes, sizes, and be disposed at locations corresponding to a quad small form factor pluggable double data rate device.

Each of the first device receiver electrical connector contacts (e.g., 104.4) may be operably connected to the first hardware component connection (106) or the inter-receiver connection (110). For example, each of the first device receiver electrical connector contacts (e.g., 104.4) may be operably connected via wire line to a corresponding portion (e.g., a wire line of a wired connection used to implement the connection) of a connection. The first device receiver electrical connector contacts (e.g., 104.4) may be operably connected to respective portions of a connection via other methods without departing from embodiments disclosed herein.

In one or more embodiments, the first device receiver electrical connector contact array (104.6) is divided into portions (e.g., 104.8, 104.10). Each of the first device receiver electrical connector contacts (e.g., 104.4) of the respective portions may be operably connected to a corresponding connection.

For example, the first portion (104.8) may be operably connected to the first hardware component connection (106) and the second portion (104.10) may be operably connected to the inter-receiver connection (110). Thus, depending on the number and arrangement of contacts on a device, the device may be operably connected to (i) only the first hardware component connection (106) or (ii) both of the first hardware component connection (106) and the inter-receiver connection (110).

For example, consider a scenario where a first device includes a contact array with contacts only corresponding to the first portion (104.8). In such a scenario, the first device may only be operably connected to the first hardware component connection (106) while the first device is received by the first device receiver.

In another example, consider a second scenario where a second device includes a contact array with contacts that correspond to both the first portion (104.8) and the second portion (104.10). In the case of the second scenario, the second device may be operably connected to both of the first hardware component connection (106) and the inter-receiver connection (110) while the first device is received by the first device receiver.

While the first device receiver electrical connector (104.2) has been described and illustrated as including a limited number of specific components, a device receiver electrical connector in accordance with one or more embodiments may include fewer, different, and/or additional components without departing from embodiments disclosed herein.

For example, the first device receiver electrical connector (104.2) may include mechanical loading components adapted to press the first device receiver electrical connector contact array (104.6) against corresponding contacts of a device. By doing so, the likelihood of successfully forming an electrical connection based on mechanical contact between the contacts may be improved.

Additionally, while the first device receiver electrical connector contact array (104.6) is illustrated as a number of contacts disposed on a surface, the first device receiver electrical connector contact array (104.6) may include a different number of contacts (e.g., 104.4), the contacts may be disposed in a different arrangement than illustrated in FIG. 4, and the contacts may be disposed on multiple surfaces (e.g., on two sides of a clam-shell connector to receive a paddle card).

In one or more embodiments, the contacts of the first device receiver electrical connector contact array (104.6) are adapted to mate with a paddle card. A paddle card may be a circuit card having any number of contacts disposed on two sides of the circuit card. Devices received by the first device receiver may include a paddle card as the device electrical connector. Depending on the type of the device, the paddle card of the device may include different numbers of contacts in different arrangements to facilitate forming different types of connections between the paddle card and the first device receiver electrical connector (104.2).

As discussed above, a combiner may be used to reallocate connections between different receivers. To do so, the combiner may operably connect some, or all, of the contacts of the first device receiver electrical connector (104.2). For example, the combiner may operably connect the contacts of the first portion (104.8) to contacts of the second portion (104.10). By doing so, the first hardware component connection (106) may be operably connected to the inter-receiver connection (110).

FIG. 5 shows a top view diagram of a portion of a combiner (112) in accordance with one or more embodiments. The combiner (112) may include a combiner electrical connector (112.2). The combiner electrical connector (112.2) may have a shape and a combiner electrical connector contact array (112.6) that is complementary to the first device receiver electrical connector (104.2). For example, the combiner electrical connector (112.2) may be implemented as a paddle card and the first device receiver electrical connector (104.2) may be implemented as a clamshell connector adapted to receive a paddle card.

The combiner electrical connector contact array (112.6) may include any number of combiner electrical connector contacts (e.g., 112.4). The combiner electrical connector contacts (e.g., 112.4) may be adapted to form electrical connections with other contacts while the combiner electrical connector contacts (e.g., 112.4) are disposed on the other contacts (e.g., contacts of the first device receiver electrical connector (104.2). Disposing the combiner electrical connector contacts (e.g., 112.4) on other contacts may form one or more electrical connection between the aforementioned contacts.

In one or more embodiments, the combiner electrical connector contacts (e.g., 112.4) are arranged to match the contacts of a quad small form factor pluggable double data rate device receiver. For example, the combiner electrical connector contacts (e.g., 112.4) may have shapes, sizes, and be disposed at locations corresponding to a quad small form factor pluggable double data rate device.

Like the first device receiver electrical connector (104.2), the combiner electrical connector contacts (e.g., 112.4) may be divided into two portions (112.8, 112.10) corresponding to the portions (104.8, 104.10) of the contacts of the first device receiver electrical connector (104.2). All, or a portion, of the combiner electrical connector contacts (e.g., 112.4) of each of the portions (112.8, 112.10) may be operably connected to respective combiner electrical connector contacts (e.g., 112.4) of other portions. By doing so, the combiner (112) may be used to form an operable connection between the respective portions of contacts of the first device receiver electrical connector (104.2).

To operably connect the combiner electrical connector contacts (e.g., 112.4) of the different portions, the combiner electrical connector (112.2) may include any number of combiner electrical connector contact interconnects (112.12). The combiner electrical connector contact interconnects (112.12) may be physical devices for interconnecting contacts of the combiner (112). The combiner electrical connector contact interconnects (112.12) may be, for example, traces on a circuit board, embedded traces within a circuit board, wire lines, or any other type of structure for electrically connecting two of the contacts of the combiner (112).

In one or more embodiments, the combiner electrical connector contact interconnects (112.12) are adapted to limit cross talk (e.g., electromagnetic interference caused by electrical current) between electrical signals. For example, the combiner electrical connector contact interconnects (112.12) may interconnect the contacts to spatially group high power electrical signals from low power electrical signals traversing through the combiner electrical connector contact interconnects (112.12).

Figure 6:
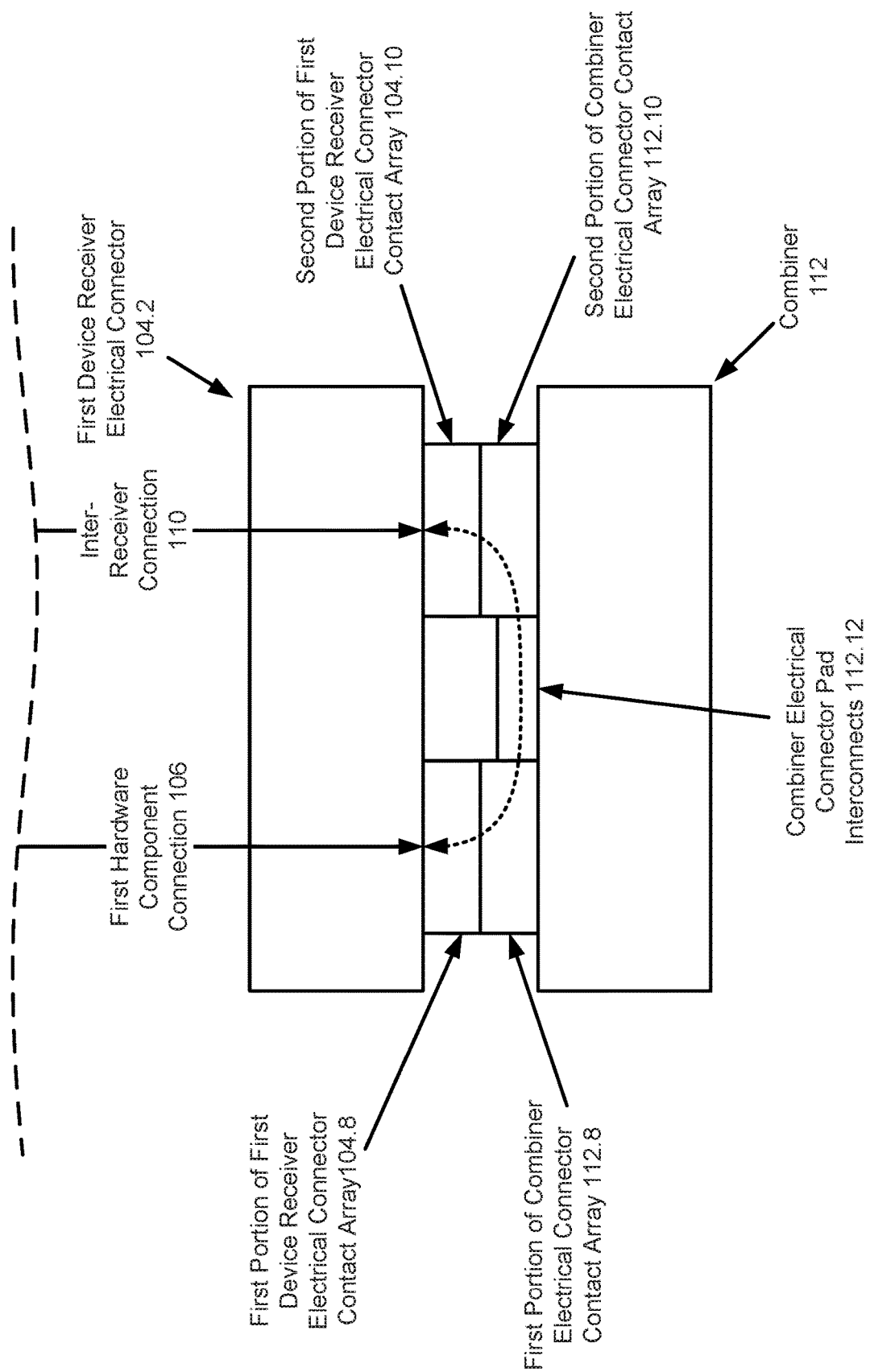
FIG. 6 shows a diagram of the device receiver electrical connector and the electrical connector of the combiner in accordance with one or more embodiments disclosed herein.

To further clarify aspects of the combiner (112), a sideview diagram of a portion of the combiner (112) and the first device receiver electrical connector (104.2) in accordance with one or more embodiments is shown in FIG. 6. In FIG. 6, the combiner (112) and the first device receiver electrical connector (104.2) are illustrated in an orientation representative of the combiner (112) being received by the first device receiver.

Specifically, as seen in FIG. 6, when the combiner (112) is received by the first device receiver, the first portion of the combiner electrical connector contact array (112.8) may be disposed on the first portion of the first device receiver electrical connector contact array (104.8) thereby electrically connecting contacts of each of these portions. Similarly, the second portion of the combiner electrical connector contact array (112.10) may be disposed on the second portion of the first device receiver electrical connector contact array (104.10) thereby electrically connecting contacts of each of these portions.

Because of the newly formed electrical connections, the first hardware component connection (106) may be operably connected to the inter-receiver connection (110). For example, electrical signals transmitted between the first hardware component connection (106) and the inter-receiver connection (110) may be transmitted through the first portion of the first device receiver electrical connector contact array (104.8), the first portion of the combiner electrical connector contact array (112.8), the combiner electrical connector pad interconnects (112.12), the combiner electrical connector contact array (112.10), and the second portion of the first device receiver electrical connector contact array (104.10). The aforementioned electrical signals path is illustrated in FIG. 6 by the short-dashed line terminating in two arrows.

The combiner (112) and the first device receiver electrical connector (104.2) may have other shapes and may include contacts disposed on multiple surfaces without departing from embodiments disclosed herein. For example, the combiner (112) may have an electrical connector in the shape of a paddle card while the first device receiver electrical connector (104.2) may have an electrical connector for receiving the paddle card.

As discussed above, the combiner (112) may be used to reallocate hardware component connections. FIGS. 7.1-7.2 illustrates methods for reallocating hardware component connections in accordance with one or more embodiments of embodiments disclosed herein.

FIG. 7.1 shows a flowchart describing a method for reallocating a hardware component connection to aggregate at least two hardware component connections to a device receiver in accordance with one or more embodiments disclosed herein.

While the various steps in the flowchart shown in FIG. 7.1 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 700, a determination is made that the device disposed in a device receiver of a network device supports a higher communication rate than is supported by first connection that is allocated to the receiver. The determination may be made based on the type of the device.

In one or more embodiments, the first connection is a hardware component connection that operably connects the device receiver to a hardware component.

The device may be, for example, an optical transceiver or another type of device for facilitating medications between the network device and other devices. In one or more embodiments, optical transceiver is packaged as a quad small form factor pluggable double data rate device. The device receiver may be adapted to receive the quad small form factor pluggable double data rate device.

In one or more embodiments, optical transceiver supports 400G communications via 2×200GBASE-SR4 Ethernet links. In one or more embodiments, the first connection supports 200G communications via 2×100GBASE-SR4 Ethernet.

In step 702, the combiner is inserted into a second device receiver that is directly connected to the first device receiver to reallocate a second connection, that is allocated to the second device receiver, to the first device receiver.

In one or more embodiments, inserting the combiner into the second device receiver causes the second device receiver to receive the combiner. For example, the combiner may be operably connected to the second device receiver when inserted into the second device receiver.

In one or more embodiments, the second device receiver is directly connected to the first device receiver via an inter-receiver connection. In one or more embodiments, the inter-receiver connection supports 200G communications via 2×100GBASE-SR4 Ethernet.

In one or more embodiments, the second connection is a second hardware component connection that operably connects the second device receiver to the hardware component. In one or more embodiments, the second connection supports 200G communications via 2×100GBASE-SR4 Ethernet.

In one or more embodiments, the second connection is operably connected to the device while the combiner is received by the second device. In turn, the hardware component may be operably connected to the device through (i) the first hardware component connection and (ii) both of the second hardware component connection and the inter-receiver connection.

In one or more embodiments, a second device disposed in the second device receiver is removed from the second device receiver prior to inserting the combiner.

In step 704, the hardware component communicates with the device at the higher rate of communications using the first connection and reallocated second connection. For example, the hardware component may treat the combination of the first connection and the reallocated second connection as a single connection through which the hardware component communicates with the device disposed in the device receiver.

The method may end following step 704.

FIG. 7.2 shows a flowchart describing a method for reallocating a hardware component connection to disaggregate at least two hardware component connections in accordance with one or more embodiments disclosed herein.

While the various steps in the flowchart shown in FIG. 7.2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 710, a determination is made that a device disposed in a device receiver of a network device supports a lower data rate than is supported by a connection that is allocated to the device receiver.

In one or more embodiments, the connection operably connects the device receiver to a hardware component. In one or more embodiments, the connection is an aggregate connection that includes at least two hardware component connections.

The device may be, for example, an optical transceiver or another type of device for facilitating communications between the network device and other devices. In one or more embodiments, optical transceiver is packaged as a quad small form factor pluggable double data rate device. The device receiver may be adapted to receive the quad small form factor pluggable double data rate device.

In one or more embodiments, the optical transceiver supports 200G communications via 2×100GBASE-SR4 Ethernet links. In one or more embodiments, the connection supports 400G communications via 2×200GBASE-SR4 Ethernet. The 200G and 400G communications may be supported using different types of Ethernet links (e.g., 1×200GBASE-SR4 Ethernet links for 200G communications) without departing from embodiments. Additionally, the 200G and 400G communications may be supported using other communications protocols (e.g., other than Ethernet links) without departing from embodiments.

In step 712, the combiner is removed from a second device receiver that is directly connected to the device receiver to reallocate a portion of the connection to the second device receiver.

In one or more embodiments, removing the combiner from the second device receiver eliminates an operable connection supporting the portion of the connection. For example, the portion of the connection may be supported by an inter-receiver connection. The inter-receiver connection may be part of the signal path between the hardware component and the device receiver.

In one or more embodiments, the second device receiver is directly connected to the first device receiver via an inter-receiver connection. In one or more embodiments, the inter-receiver connection supports 200G communications via 2×100GBASE-SR4 Ethernet. The 200G communications may be supported using different types of Ethernet links (e.g., 1×200GBASE-SR4 Ethernet links for 200G communications) without departing from embodiments. Additionally, the 200G communications may be supported using other communications protocols (e.g., other than Ethernet links) without departing from embodiments.

In one or more embodiments, a second device is disposed in the second device receiver after the combiner is removed from the second device receiver.

In step 714, communication services between hardware component and the second device disposed in the second device receiver are provided using the portion of the connection. In one or more embodiments, the second portion of the connection corresponds to a second hardware component connection that operably connects the hardware component and the second device receiver.

In one or more embodiments, the communication services are provided by enabling electrical signals representing data to be sent between the second device in the hardware component.

In one or more embodiments, the second device is a second optical transceiver. The second optical transceiver may support 200G communications via 2×100GBASE-SR4 Ethernet links. In one or more embodiments, the second hardware component connection supports 200G communications via 2×100GBASE-SR4 Ethernet. The 200G communications may be supported using different types of Ethernet links (e.g., 1×200GBASE-SR4 Ethernet links for 200G communications) without departing from embodiments. Additionally, the 200G communications may be supported using other communications protocols (e.g., other than Ethernet links) without departing from embodiments.

The method may end following step 714.

Thus, via the methods illustrated in FIGS. 7.1-7.2, a combiner may be used to reallocate operable connections between hardware components and device receivers. By doing so, the limited communication bandwidth available to devices disposed in the device receivers may be matched to the communication bandwidths of the devices to improve the efficiency of using the limited communication bandwidth.

To further clarify aspects of the embodiments disclosed herein, an example of reallocating operable connections is shown in FIGS. 8.1-8.4. The following example is for explanatory purposes only and not intended to limit the scope of embodiments described herein. Additionally, while the example shows certain aspects of embodiments described herein, all possible aspects of such embodiments may not be illustrated in this particular example.

FIG. 8.1 shows a diagram of a network device (100) in accordance with embodiments disclosed herein. To communicate with external entities, a first low speed device (802) and a second low speed device (804) may be received by the first device receiver (104) and the second device receiver (105), respectively.

To communicate with external entities, the hardware component (102) of the network device (100) may send and receive electrical signals to and from the first low speed device (802) via a first hardware component connection (106). Similarly, the hardware component (102) of the network device (100) may also send electrical signals to and from the second low speed device (804) via a second hardware component connection (108).

Based on the received electrical signals, the first low speed device (802) may generate optical signals and transmit the optical signals to other devices via a first low speed device output (802.2). The first low speed device output (802.2) may be optical fiber physically connected to other devices. Similarly, based on the received electrical signals, the second low speed device (804) may generate optical signals and transmit the optical signals to other devices via a second low speed device output (804.2). The second low speed device output (804.2) may also be optical fiber physically connected to other devices.

The maximum rate of communications by the first low speed device (802) may match a maximum communication rate supported by the first hardware component connection (106). Similarly, the maximum rate of communications by the second low speed device (804) may match a maximum communication rate supported by the second hardware component connection (108).

At a first point in time as illustrated in FIG. 8.2, the second low speed device (804) may be replaced by a high-speed device (806). The high-speed device (806) may support communications at a rate that is double communication rate supported by the second hardware component connection (108). Thus, as illustrated in FIG. 2.2, the network device (100) may be inefficiently using communications bandwidth of the high-speed device (806) by failing to provide it with a communications rate between the hardware component (102) and the high-speed device (806) that matches the maximum communications rate of the high-speed device (806). For example, the high-speed device (806) may be able to communicate via the high-speed device output (806.2) at a rate that is double the communications rate of the second hardware component connection (108).

A determination is made, based on the inefficient use of the maximum communications rate of the high-speed device (806), to reallocate the first hardware component connection (106) to the second device receiver. To do so, the first low speed device (802) is removed from the first device receiver (104) as illustrated in FIG. 8.3.

After removing the first low speed device (802), a combiner (808) is received by the first device receiver (104) as illustrated in FIG. 8.4. As seen from FIG. 8.4, while the combiner (808) is received by the first device receiver (104), an operable connection between the hardware component (102) and the high-speed device (806) is formed through the signal path including the first hardware component connection (106) and the inter-receiver connection (110). By doing so, the communication rate of the first hardware component connection (106) may be reallocated to the second device receiver (105) to enable the high-speed device (806) to use both the first hardware component connection (106) and the second hardware component connection (108) for communications with the hardware component (102). Consequently, in the state illustrated in FIG. 8.4, the network device (100) is able to efficiently use its limited communications rate by matching the communications rate between the hardware component (102) and the high-speed device (806) to the communications rate at which the high-speed device (806) is able to communicate with other entities through its high speed device output (806.2).

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network device, comprising:
    a hardware component adapted to forward network data units received by the network device;
    a first device receiver operably connected to the hardware component via a first hardware component connection;
    a second device receiver operably connected to the hardware component via a second hardware component connection and adapted to receive a second device, wherein the second device comprises an optical transceiver; and
    an inter-receiver connection that connects the first device receiver and the second device receiver directly to each other,
    a combiner that is received by the first device receiver, wherein the first device receiver comprises:
        a contact array adapted to:
            operably connect to the combiner using only a first portion of the contact array; and
            operably connect to the second device using the first portion of the contact array and a second portion of the contact array;
    wherein the combiner is adapted to:
        be reversibly inserted in the first device receiver; and
        while inserted in the first device receiver, operably connect the first portion of the contact array to the second portion of the contact array.

2. The network device of claim 1, wherein the combiner operably connects the first hardware component connection to the inter-receiver connection using the first device receiver.

3. The network device of claim 1, wherein the first portion of the contact array is operably connected to the first hardware component connection.

4. The network device of claim 1, wherein the second portion of the contact array is operably connected to the second hardware component connection, wherein the second portion of the contact array is not operably connected to the first hardware component connection.

5. The network device of claim 1, wherein the hardware component is adapted to:
    communicate with the combiner using only the first hardware component connection; and
    communicate with the second device using both of the first hardware component connection and the second hardware component connection in aggregate.

6. The network device of claim 1, wherein operably connecting the first portion of the contact array to the second portion of the contact array operably connects the first hardware component connection to the second device receiver via the inter-receiver connection without disconnecting the second hardware component connection from the hardware component and the second device receiver.

7. The network device of claim 1, wherein reversibly reallocating the first hardware component connection to the second device receiver doubles a communication bandwidth between the second device receiver and the hardware component.

8. The network device of claim 1, wherein the device comprises the optical transceiver.

9. The network device of claim 1, wherein the first device receiver is adapted to receive quad small form factor pluggable double data rate devices.

10. The network device of claim 9, wherein the first device receiver is further adapted to receive quad small form factor pluggable devices.

11. The network device of claim 1, wherein a first portion of the network data units received by the network device via the second device receiver are transmitted to the hardware component using the inter-receiver connection and the first hardware component connection, wherein a second portion of the network data units received by the network device via the second device receiver are transmitted to the hardware component using the second hardware component connection.

12. A method, comprising:
    making a determination, based on a type of a device disposed in a first device receiver, that the device supports a higher rate of communications than is supported by a first connection that is allocated to the first device receiver,
    wherein the first connection operably connects the first device receiver to a hardware component of a network device that forwards network data units,
    wherein the device comprises an optical transceiver;
    in response to the determination:
        inserting a combiner into a second device receiver, that is directly connected to the first device receiver via an inter-receiver connection and the hardware component via the first connection, to reallocate a second connection, that directly connects the second device receiver to the hardware component and that is allocated to the second device receiver, to the first device receiver while the second connection between the hardware component and the second device receiver is maintained,
        wherein reversibly inserting the combiner into the second device receiver operably connects a first portion of a contact array of the second device receiver to a second portion of the contact array of the second device receiver; and
        communicating, using the hardware component, with the device at the higher rate of communications by transmitting:

a first portion of the network data units to the hardware component via the first connection, and a second portion of the network data units to the hardware components via the reallocated second connection and the inter-receiver connection that directly connects the first device receiver to the second device receiver.

13. The method of claim 12, wherein inserting the combiner into the second device receiver operably connects the second connection to the inter-receiver connection.

14. The method of claim 12, wherein the higher rate of communications is double that of a communication rate supported by the first connection.

15. The method of claim 13, wherein the second portion of the contact array of the second device receiver is directly connected to the first device receiver.

16. The method of claim 13, wherein the first portion of the contact array of the second device receiver is connected to the hardware component.

\* \* \* \* \*